3,342,904
N - HYDROXY(ALKOXY) - N - ALKYL α - (O,O - DI-
ALKYL - PHOSPHOROTHIO(DITHIO)ATES) - β-
ALKOXYCARBONYLPROPIONAMIDES
Eugene F. Barnas and Sidney B. Richter, Chicago, Ill.,
assignors to Velsicol Chemical Corporation, Chicago,
Ill., a corporation of Illinois
No Drawing. Filed Sept. 21, 1964, Ser. No. 398,059
8 Claims. (Cl. 260—942)

This invention relates to new chemical compositions of matter. More specifically, this invention relates to new chemical compounds of the formula:

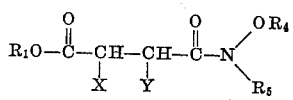

wherein X and Y are selected from the group consisting of hydrogen and

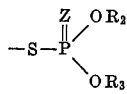

provided that one, and only one, of X and Y is hydrogen; $R_1$, $R_2$, and $R_3$ are alkyl; $R_4$ and $R_5$ are independently selected from the group consisting of hydrogen and alkyl; and Z is independently selected from the group consisting of sulfur and oxygen. In a preferred embodiment of this invention, X and Y are as described above; $R_1$, $R_2$ and $R_3$ are alkyl groups containing one to ten carbon atoms; $R_4$ and $R_5$ are independently selected from the group consisting of hydrogen and alkyl containing one to ten carbon atoms; and Z is sulfur. These new chemical compounds are useful as pesticides, particularly as insecticides and miticides.

These new compounds can be prepared readily from the corresponding appropriately substituted monoester-alkenyl-mono amide intermediate by reaction at its unsaturation with an appropriate phosphorus acid of the formula HS—P(Z)(OR$_2$)(OR$_3$) wherein $R_2$, $R_3$ and Z are as described above. The substituted monoester-alkenyl-mono amide intermediate can be prepared conveniently from its corresponding alkenyl diacid. The alkenyl diacid is first converted to the corresponding monoester-alkenyl-mono acid halide and then treated with an appropriate amine of the formula HN(OR$_4$)(R$_5$) to replace the halide and form the desired mono amide.

Suitable alkenyl diacids are known to the art and many are commercially available. Examples of these alkenyl diacids are: fumaric acid, maleic acid, mesaconic acid, citraconic acid, glutaconic acid, ethylmaleic acid, n-propylmaleic acid, isopropylmaleic acid, n-butylmaleic acid, ethyl fumaric acid, n-propylfumaric acid, isopropyl fumaric acid, n-butylfumaric acid, α-methylglutaconic acid, β-methylglutaconic acid, α,α-dimethyl-glutaconic acid, α,β-dimethylglutaconic acid, α,α,β - trimethylglutaconic acid, α-dihydromuconic acid, β-dihydromuconic acid, and the like.

The amines which are useful as reactants to form the amides of the present invention are those having the formula:

wherein $R_4$ and $R_5$ are as heretofore described. These amines can be prepared by the reduction of the corresponding oximes as described by Jones and Major, J. Am. Chem. Soc., vol. 52, pp. 669–79 (1930). Exemplary of suitable amines which are useful in the preparation of compounds of the present invention are: hydroxylamine, N-methoxyamine, N - methoxy-N-isopropylamine, N-hydroxy-N-methylamine, N - ethoxyamine, N-methoxy-N-methylamine, N-ethoxy - N - methylamine, N-ethoxy-N-ethylamine, N-methoxy - N - ethylamine, N-n-propoxy-N-methylamine, N-n-propoxy-N-ethylamine, N-isopropoxy-N-methylamine, N-isopropoxy-N-ethylamine, N-ethoxy-N - isopropylamine, N-n-propoxy-N-isopropylamine, N-isopropoxy-N-isopropylamine, N-butoxy-N-methylamine, N-methoxy-N-butylamine, N-pentoxy-N-methylamine, N-methoxy-N-pentylamine, N - hexoxy-N-methylamine, N-methoxy-N-hexylamine, N-heptoxy-N-methylamine, N-methoxy-N-heptylamine, N - octoxy-N-methylamine, N-methoxy-N-octylamine, N - monoxy-N-methylamine, N-methoxy-N-nonylamine, N - decoxy-N-methylamine, N-methoxy-N-decylamine, and the like.

The phosphorus acids which can be used as reactants in the preparation of the compounds of the present invention have the formula:

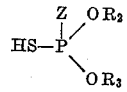

wherein Z, $R_2$ and $R_3$ are as heretofore described. While these compounds are generically termed "phosphorus acids," when Z is sulfur, the phosphorus compounds are called O,O-dialkyl phosphorodithioates. Examples of these compounds are O,O-dimethyl hydrogen phosphorodithioate, O-methyl-O-ethyl hydrogen phosphorodithioate, O,O-diethyl hydrogen phosphorodithioate, O,O-di-n-propyl hydrogen phosphorodithioate, O,O-diisopropyl hydrogen phosphorodithioate, O,O-dibutyl hydrogen phosphorodithioate, O,O-dipentyl hydrogen phosphorodithioate, O,O-dihexyl hydrogen phosphorodithioate, O,O-diheptyl hydrogen phosphorodithioate, O,O-dioctyl hydrogen phosphorodithioate, O,O-dinonyl hydrogen phosphorodithioate, O,O-didecyl hydrogen phosphorodithioate, and the like. When Z is oxygen the compounds are called O,O-dialkyl phosphorothiolates. Exemplary compounds are: O,O-dimethyl hydrogen phosphorothiolate, O-methyl-O-ethyl hydrogen phosphorothiolate, O,O-diethyl hydrogen phosphorothiolate, O,O-di-n-propyl hydrogen phosphorothiolate, O,O-diisopropyl hydrogen phosphorothiolate, O,O-dibutyl hydrogen phosphorothiolate, O,O-dipentyl hydrogen phosphorothiolate, O,O-dihexyl hydrogen phosphorothiolate, O,O-diheptyl hydrogen phosphorothiolate, O,O-dioctyl hydrogen phosphorothiolate, O,O-dinonyl hydrogen phosphorothiolate, O,O-didecyl hydrogen phosphorothiolate, and the like.

More particularly, the new compounds of the present invention can be prepared by the reaction of a monoester-alkenyl-mono amide with a suitable phosphorus acid, such as those heretofore described. At least molecularly equivalent proportions of the reactants should be used, although it is desirable to use an excess of the phosphorus acid. The reaction can be carried out without a solvent, but inert solvents or diluents can be used if desired. Although the exact temperature at which the reaction is carried out is not critical, reaction temperatures in the range of from about normal room temperature to about 80° C. are preferred. It is also preferred to add a small amount of an oxidation inhibitor such as hydroquinone to the reaction mixture. After the reaction is completed, the mixture is filtered, washed with a dilute aqueous base solution such as aqueous solution of sodium or potassium carbonate, washed with water, dried, and the solvent distilled off in vacuo to recover the crude product of the present invention as the residue. This crude product is often sufficiently pure for pesticidal use as such, or if desired it can be purified by means common to the art, such as distillation.

The monoester-alkenyl-mono amides can be readily prepared from the corresponding monoester-alkenyl-mono acid halide by reacting it with a suitable amine exemplified above. The monoester-alkenyl-mono acid halide, in turn, can be prepared by the reaction of a corresponding diacid, heretofore described, with an appropriate alcohol, such as ethanol. In the preparation of the acid halide, it is preferred to react one acid group with a suitable alcohol such as methanol, ethanol, n-propanol, isopropanol, butanol, pentanol, hexanol, heptanol, octanol, nonanol, decanol and the like, to form an ester before forming the acid halides by treating the compound with thionyl chloride.

The manner in which the new compounds of this invention can be prepared is illustrated in the following examples.

EXAMPLE 1

*Preparation of monethyl ester fumaroyl monochloride*

Fumaric acid monoethyl ester (50.0 g.; 0.347 mole) was placed into a 200 ml., three-necked, round-bottom flask fitted with a reflux condenser, topped with a calcium chloride drying tube, an addition funnel, and a mechanical stirrer. Thionyl chloride (60 ml.) was added to the flask and the contents were stirred and heated at reflux for about 2½ hours. Excess thionyl chloride was removed from the reaction mixture by vacuum, and the residual oil was distilled under reduced pressure to recover monoethyl ester fumaroyl monochloride as a distillate.

EXAMPLE 2

*Preparation of ethyl N-methoxy-N-isopropylfumarate*

Ether (100 ml.) was added to a solution of sodium hydroxide (5.2 g.; 0.13 mole) dissolved in water (40 ml.) in a 300 ml. round-bottom flask, and the mixture was stirred and cooled to about 5° C. Then N-methoxy-N-isopropylamine hydrochloride (8.2 g.; 0.066 mole) was added in a single portion and stirred with cooling. Monoethyl ester fumaroyl monochloride (10.6 g.; 0.065 mole), prepared as described in Example 1, was added in portions over a period of about 10 minutes while the reaction mixture was maintained at between 6° and 12° C. After the addition was completed, the reaction mixture was stirred for about a ½ hour, transferred to a separatory funnel, washed with 5% aqueous potassium carbonate solution and then with water. The organic layer was separated, dried over anhydrous magnesium sulfate, filtered, and the ether was removed from the filtrate in vacuo leaving the crude ethyl N-methoxy-N-isopropylfumarate, a colorless oil, as the residue. This residue was subjected to distillation to yield 12.7 g. of the purified liquid product.

EXAMPLE 3

*Preparation of N-methoxy-N-isopropyl α-(O,O-dimethylphosphorodithioate)-β-ethoxycarbonylpropionamide*

Ethyl N-methoxy-N-isopropylfumarate (5.0 g.; 0.0232 mole), prepared as described in Example 2, was mixed with O,O-dimethyl hydrogen phosphorodithioate (6.0 g.; 0.038 mole), hydroquinone (0.1 g.) and benzene (125 ml.) in a 300 ml. three-necked, round bottom flask equipped with a reflux condenser and mechanical stirrer. The mixture was stirred and heated at reflux overnight. After cooling, the benzene was removed in vacuo leaving a dark oil residue which was dissolved in ether, washed with 5% aqueous potassium carbonate solution and then with water. The ether solution was dried over anhydrous magnesium sulfate, filtered and the ether was removed from the filtrate in vacuo. The residual oil was subjected to aspiration by means of a vacuum pump overnight, and then the oil was filtered yielding the desired product, N-methoxy - N-isopropyl α-(O,O - dimethylphosphorodithioate)-β-ethoxy-carbonylpropionamide.

Analysis for $C_{12}H_{24}NO_6PS_2$. Theory (percent): C, 55.81; H, 7.91; N, 6.51. Found: C, 54.61; H, 8.08; N, 6.65.

EXAMPLE 4

*Preparation of ethyl N-methoxy-N-methylfumarate*

Ether (100 ml.) was added to a solution of sodium hydroxide (8.0 g.; 0.20 mole) dissolved in water (50 ml.) in a 300 ml. round-bottom flask, and the mixture was stirred and cooled at about 5° C. Then N-methoxy-N-methylamine·hydrochloride (10 g.; 0.16 mole) was added and stirring was continued for five minutes. Monoethyl ester fumaroyl monochloride (15.1 g.; 0.16 mole), prepared as described in Example 1, was added in portions over a period of about five minutes, during the addition the temperature of the stirred mixture rose from 5° to 22° C. After the addition was completed, the reaction mixture was stirred for about 45 minutes, transferred to a separatory funnel, washed with 5% aqueous potassium carbonate solution (20 ml.) and then with water. The ether layer was dried over anhydrous magnesium sulfate, filtered and the ether was removed from the filtrate in vacuo leaving the crude ethyl N-methoxy-N-methylfumarate, an oil, as the residue. This residue was subjected to vacuum distillation to yield 12.4 g. of the purified colorless liquid product.

EXAMPLE 5

*Preparation of N-methoxy-N-methyl α-(O,O-dimethylphosphorodithioate)-β-ethoxy-carbonylpropionamide*

Ethyl N-methoxy-N-methylfumarate (6.0 g.; 0.032 mole), prepared as described in Example 4, was mixed with O,O-dimethyl hydrogen phosphorodithioate (6.5 g.; 0.041 mole), hydroquinone (0.1 g.) and benzene (125 ml.) in a 300 ml. round bottom flask. The mixture was stirred and heated at reflux overnight. After cooling, the mixture was filtered and the benzene was removed in vacuo leaving an oil residue which was dissolved in ether, washed with 5% aqueous potassium carbonate solution (200 ml.) and then with water. The ether solution was dried over anhydrous magnesium sulfate, filtered and the ether was removed from the filtrate in vacuo. The residual oil was subjected to aspiration by means of a vacuum pump overnight, and then the oil was filtered yielding 10.5 g. of the desired product, N-methoxy-N-methyl α-(O,O - dimethylphosphorodithioate) - β - ethoxycarbonylpropionamide, a red oil.

Analysis for $C_{10}H_{20}O_6NS_2P$. Theory (percent): P, 8.98; N, 4.06. Found: P, 9.46; N, 3.75.

EXAMPLE 6

*Preparation of N-methoxy-N-isopropyl α-(O,O-dimethylphosphorothiolate)-β-ethoxycarbonylpropionamide*

Ethyl N-methoxy-N-isopropylfumarate (5.0 g.; 0.0232 mole), prepared as described in Example 2, is mixed with O,O-dimethyl hydrogen phosphorothiolate (5.4 g.; 0.038 mole), hydroquinone (0.1 g.) and benzene (125 ml.) in a 300 ml. three-necked round-bottom flask equipped with a reflux condenser and mechanical stirrer. The mixture is stirred and heated at reflux overnight. After cooling, the benzene is removed by vacuum leaving an oil, which is dissolved in ether, and treated as described in Example 3 to yield the desired compound, N-methoxy-N-isopropyl α-(O,O-dimethylphosphorothiolate) - β-ethoxycarbonylpropionamide.

EXAMPLE 7

*Preparation of monomethyl ester maloyl monochloride*

Monomethyl maleate (10.5 g.; 0.15 mole) is placed into a 250 ml., three-necked, round-bottom flask fitted with a reflux condenser topped with a calcium chloride drying tube, and addition funnel, and a mechanical stirrer. Thionyl chloride (30.2 ml.) is added to the flask and the contents stirred and heated at reflux for about 3 hours. Excess thionyl chloride is removed from the reaction mixture in vacuo, and the remaining mixture is distilled in vacuo to recover monomethyl ester maloyl monochloride as a distillate fraction.

EXAMPLE 8

*Preparation of methyl N-methoxy-N-isopropylmaleamate*

Ether (100 ml.) is added to a solution of sodium hydroxide (5.2 g.; 0.13 mole) dissolved in water (40 ml.), the mixture is cooled, and N-methoxy-N-isopropylamine· hydrochloride (7.5 g.; 0.60 mole) is added with stirring. Monomethyl ester maloyl monochloride (9.62 g.; 0.65 mole), prepared as described in Example 5, is added in portions over a period of about 10 minutes while the reaction mixture is maintained at between 6° and 12° C. After the addition is completed, the reaction mixture is stirred, transferred to a separatory funnel, washed with 5% aqueous potassium carbonate and then with water. The organic layer is separated, dried over anhydrous magnesium sulfate, filtered and the ether is removed from the filtrate by vacuum, leaving the crude methyl N-methoxy-N-isopropylmaleamate as the residue.

EXAMPLE 9

*Preparation of N-methoxy-N-isopropyl α-(O,O-dimethyl-phosphorodithioate)-β-methoxycarbonylpropionamide*

Methyl N-methoxy-N-isopropylmaleamate (4.63 g.; 0.023 mole), prepared as described in Example 6, is mixed with O,O-dimethyl hydrogen phosphorodithioate (6.0 g.; 0.038 mole), hydroquinone (0.1 g.) and benzene (125 ml.) in a 300 ml. three-necked, round-bottom flask equipped with a reflux condenser and a mechanical stirrer. The mixture is stirred and heated at reflux overnight. After cooling, the benzene is removed in vacuo to leave an oil as the residue, which is dissolved in ether, washed with 5% aqueous potassium carbonate solution and then with water, dried over anhydrous magnesium sulfate, filtered and the ether is removed from the filtrate by vacuum. The residual oil is treated as described in Example 3 to yield the desired product, N-methoxy-N-isopropyl α - (O,O - dimethylphosphorodithioate)-β-methoxycarbonylpropionamide.

It will be readily recognized that in view of the preparation procedure detailed in the above examples, one skilled in the art could now prepare other compounds within the scope of the present invention from the appropriate starting materials heretofore described. Thus, by way of illustration, in the examples below are presented the appropriate starting materials and reactants required to prepare compounds of the present invention.

EXAMPLE 10

Fumaric acid+n-propanol+thionyl chloride+N-methoxy-N-isopropylamine+O,O-dimethyl hydrogen phosphorodithioate=N-methoxy-N-isopropyl α-(O,O-dimethylphosphorodithioate)-β-n-propylcarbonylpropionamide.

EXAMPLE 11

Fumaric acid+isopropanol+thionyl chloride+N-methoxy-N-isopropylamine+O,O-dimethyl hydrogen phosphorodithioate=N-methoxy-N-isopropyl α-(O,O-dimethylphosphorodithioate)-β-isopropylcarbonylpropionamide.

EXAMPLE 12

Fumaric acid+ethanol+thionyl chloride+N-methoxy-N-isopropylamine+O,O-diethyl hydrogen phosphorodithioate=N-methoxy-N-isopropyl α-(O,O-diethylphosphorodithioate)-β-ethoxycarbonylpropionamide.

EXAMPLE 13

Fumaric acid+ethanol+thionyl chloride+N-methoxy-N-isopropylamine+O-methyl-O-ethyl hydrogen phosphorodithioate=N-methoxy-N-isopropyl α-(O-methyl-O-ethylphosphorodithioate)-β-ethoxycarbonylpropionamide.

EXAMPLE 14

Fumaric acid+ethanol+thionyl chloride+N-methoxy-N-methylamine+O,O-dimethyl hydrogen phosphorodithioate=N-methoxy-N-methyl α-(O,O-dimethyl phosphorodithioate)-β-ethoxycarbonylpropionamide.

EXAMPLE 15

Fumaric acid+ethanol+thionyl chloride+N-ethoxy-N-ethylamine+O,O-dimethyl hydrogen phosphorodithioate=N-ethoxy-N-ethyl α-(O,O-dimethylphosphorodithioate)-β-ethoxycarbonylpropionamide.

EXAMPLE 16

Fumaric acid+ethanol+thionyl chloride+N-hydroxy-N-methylamine+O,O-dimethyl hydrogen phosphorodithioate=N-hydroxy-N-methyl α-(O,O-dimethylphosphorodithioate)-β-ethoxycarbonylpropionamide.

EXAMPLE 17

Fumaric acid+ethanol+thionyl chloride+N-methoxyamine+O,O-dimethyl hydrogen phosphorodithioate=N-methoxy α-(O,O-dimethylphosphorodithioate)-β-ethoxycarbonylpropionamide.

For practical use as insecticides, the compounds of this invention are generally incorporated into insecticidal compositions which comprise an inert carrier and an insecticidally toxic amount of such a compound. Such insecticidal compositions, which can also be called formulations, enable the active compound to be applied conveniently to the site of the insect infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides can be dispersed under superatmospheric pressure as aerosols. However, preferred liquid insecticidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the insect infestation. The emulsifiers most commonly used in these concentrates are nonionic or mixtures of nonionic with anionic surface-active agents.

A typical insecticidal composition according to this invention is illustrated by the following example, in which the quantities are in parts by weight.

EXAMPLE 18

*Preparation of a dust*

Product of Example 3 ---------------------------- 10
Powdered talc ------------------------------------ 90

The above ingredients are mixed in a mechanical grinder-blender and are ground until a homogenous, free-flowing dust of the desired particle size is obtained. This dust is suitable for direct application to the site of the insect infestation.

The compounds of this invention can be applied as insecticides in any manner recognized by the art. One method for destroying insects comprises applying to the locus of the insect infestation, an insecticidal composition comprising an inert carrier and as the essential active ingredient, in a quantity which is toxic to said insects, a compound of the present invention. The concentration of the new compounds of this invention in the insecticidal compositions will vary greatly with the type of formulation and the purpose for which it is designed, but generally the insecticidal compositions will comprise from about 0.05 to about 95 percent by weight of the active compounds of this invention. In a preferred embodiment of this invention, the insecticidal compositions will comprise from about 5 to about 75 percent by weight of the active compound. The compositions can also comprise such additional substances as other pesticides, stabilizers, spreaders, deactivators, adhesives, stickers, fertilizers, activators, synergists, and the like.

The compounds of the present invention are also useful when combined with other insecticides in the insecticidal compositions heretofore described. These other insecticides can comprise from about 5% to about 95% of the active ingredients in the insecticidal compositions. Use of combinations of these other insecticides with the compounds of the present invention provide insecticidal compositions which are more effective in controlling insects and often provide results unattainable with separate compositions of the individual insecticides. The other insecticides with which the compounds of this invention can be used in the insecticidal compositions to control insects, can include halogenated compounds such as DDT, 1,1,1-trichloro-2,2-bis(p-methoxyphenyl)ethane, TDE, toxaphene, 1,1-dichloro-2,2-bis(p-ethylphenyl)-ethane, lindane, chlordane, 1,3,4,5,6,7,8,8-octachloro-3a,4,7,7a-tetrahydro-4,7-methanophthalan, aldrin, isodrin, heptachlor, endrin, dieldrin, decachlorooctahydro-1,3,4-metheno-2H-cyclobutapentalen-2-one, decachlorooctahydro-1,3,4-metheno-2H-cyclobutapentalen, 6,7,8,9,10,10-hexachloro-1,5,5a,6,9,9a-hexahydro-6,9-methano-2,4,3-benzodioxathiepin-3-oxide, chlorinated 6,7,8,9,10,10-hexachloro-1,5,5a,6,9,9a-hexahydro-3-methyl-6,9-methano-2,4-benzodioxepin, 4,4'-dichlorobenzilate, and the like; organic phosphorus compounds such as tetraethyl pyrophosphate,
octamethylpyrophosphoramide,
tetra-n-propylpyrophosphate,
tetraethyl S,S'-methylene bis(phosphorodithioate),
parathion,
methyl parathion,
O-ethyl O-p-nitrophenyl phenylthiophosphonate,
O,O-diethyl O-p-(methylsulfinyl)phenyl phosphorothioate,
O,O-diethyl O-(2-ethylmercapto)ethyl phosphorothioate,
O,O-diethyl S-(p-chlorophenylthiomethyl)phosphorodithioate,
O,O-diethyl S-(ethylmercapto)methyl phosporodithioate,
O,O-diethyl S-(ethylmercapto)ethyl phosphorodithioate,
O,O-diethyl O-(2-pyrazinyl)phosphorothioate,
O,O-diethyl O-(4-methyl-7-coumarinyl)phosphorothioate,
O,O-diethyl O-(2-isopropyl-6-methyl-4-pyrimidinyl)-phosphorothioate,
O,O-dimethyl S-phthalimidomethyl phosphorodithioate,
malathion,
O,O-dimethyl O-(2-carbomethoxy-1-methylvinyl)-phosphate,
O,O-dimethyl S-(N-methylcarbamoyl)methyl phosphorodithioate,
O,O-dimethyl S-(4-oxobenzotriazino-3-methyl)phosphorodithioate,
O,O-diethyl S-(4-oxobenzotriazino-3-methyl)phosphorodithioate,
O,O-dimethyl S-p-chlorophenylthiomethyl phosphorothioate,
O,O-dimethyl O-(2,4,5-trichlorophenyl)-phosphorothioate,
O,O-dimethyl S-(2-ethyl sulfinyl ethyl)-phosphorothioate,
O,O-dimethyl O-(2-chloro-4-nitrophenyl)-phosphorothioate,
O,O-dimethyl O-(3-chloro-4-nitrophenyl)-phosphorothioate,
O,O-dimethyl O-[chloro-2-(N,N-diethylcarbamoyl)-1-methylvinyl]phosphate,
O,O-dimethyl O-(1,2-dibromo-2,2-dichloroethyl)phosphate,
O,O-dimethyl O-(4-methylthio-m-tolyl)phosphorothioate,
O,O-dimethyl 1-hydroxy-2,2,2-trichloroethylphosphonate,
O,O-dimethyl 2,2,2-trichloro-1-(n-butryloxy)ethylphosphonate,
dimethyl 2,2-dichlorovinyl phosphate, and the like;
organic nitrogen compounds such as 4,6-dinitro-o-cresol, 2,4-dinitro-6-cyclohexylphenol, 2-nitro-1,1-bis(p-chlorophenyl)butane, 2-nitro-1,1-bis(p-chlorophenyl)propane, azobenzene, and the like; organic carbamate compounds such as 4-(methylthio)-3,5-xylyl-N-methylcarbamate, 4-dimethylamino-3-tolyl-N-methylcarbamate, 1 naphthyl N-methylcarbamate, 4-(N,N-dimethylamino)-3,5-xylyl-N-methylcarbamate, and the like; organic sulfur compounds such as phenothiazine, phenoxathiin, lauryl thiocyanate, beta,beta'-dithiocyanodiethyl ether (bis(2-thiocyanoethyl) ether), isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, paradichlorobenzene, and the like.

The compounds of the present invention can also be combined with fungicidal chemical compounds to form pesticidal compositions useful for the control of fungi and in some cases soil nematodes as well as insects. Typical examples of such fungicidal chemical compounds are ferric dimethyl dithiocarbamate, disodium ethylenebisdithiocarbamate, zinc ethylenebisdithiocarbamate, tetramethylthiuram disulfide, tetrachloro-p-benzoquinone, 2,3-dichloro-1,4-naphthoquinone, 2-n-heptadecylglyoxalidine, N-(trichloromethylthio)-1,2,3,6-tetrahydrophthalimide, 2-heptadecyl-2-imidazoline, 2,4-dichloro-6-(o-chloroanilino)-triazine, and the like.

The new compounds of this invention can be used in many ways for the control of insects. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil, seed or plant surfaces are taken up by the plant, and the insects are poisoned systematically.

The above methods of using insecticides are based on the fact that almost all the injury done by insects is a direct or indirect result of their attempts to secure food. Indeed, the large number of destructive insects can be classified broadly on the basis of their feeding habits. There are, for example, the chewing insects such as the Mexican bean beetle, the German cockroach, the American cockroach, the southern armyworm, cabbageworms, grasshoppers, the Colorado potato beetle, the earwig, the cankerworm, and the gypsy worm. There are also the piercing-sucking insects, such as the pea aphid, the house fly, the chinch bug, leafhoppers, and plant bugs.

Another group of insects comprises the internal feeders. These include borers such as the European corn borer and the corn earworm; worms or weevils such as the codling moth, cotton boll weevil, plum curculio, melonworm, and the apple maggot; leaf miners such as the apple leaf miner and the beet leaf miner; and gall insects such as the wheat jointworm and grape phylloxers. Insects which attack below the surface of the ground are classified as subterranean insects and include such destructive pests as the wooly apple aphid, the Japanese beetle, wireworm, and the corn rootworm.

The compounds of the present invention effectively control mites and ticks. Many economically important species of mites and ticks are known, including the two spotted mite, the red spider mite, the strawberry spider mite, the cattle tick, and the poultry mite. Chemicals useful for the control of mites are often called miticides, while those useful for the control of both mites and ticks are known specifically as acaricides. The compositions and techniques described above for the use of these compounds as insecticides can also be employed when the compounds are used as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

The insecticidal utility of the compound of the present invention can be demonstrated by various experiments recognized by the art. In one series of experiments, the test compounds were formulated by dissolving the compounds in acetone and dispersing the acetone solution in distilled water containing 0.2% by volume of alkyl aryl polyether alcohol type emulsifier.

In one experiment fifty adult houseflies of the CSMA strain were placed in a 2-inch by 5-inch diameter stainless steel cage having screening (14 mesh) at its top and bottom. The flies were sprayed with the above formulation containing the amount of test compound indicated below, and the mortality observed 24 hours after spraying. Some of the results were as follows:

TABLE I

| Test Chemical | Concn., Percent Actual Chemical (wt./vol. liquid sprayed) | Percent Mortality |
|---|---|---|
| N-methoxy-N-methyl α-(O,O-dimethylphosphorodithioate)-β-ethoxycarbonylpropionamide | 0.35 | 100 |
| Do | 0.10 | 100 |
| Do | 0.05 | 82 |
| N-methyoxy-N-isopropyl α-(O,O-dimethylphosphorodithioate)-β-ethoxycarbonylpropionamide | 0.35 | 100 |
| Do | 0.10 | 100 |
| Do | 0.05 | 100 |
| Do | 0.025 | 100 |
| Do | 0.01 | 100 |
| Control | 0.0 | 0 |

The utility of the compound of this invention was further illustrated by additional experiments carried out for the control of insects, by feeding. In these experiments, lima bean leaves sprayed on their top and bottom surfaces with the above formulation at the concentration indicated below were offered to ten larvae of the Mexican bean beetle (late second instar stage) for a feeding period of 48 hours. After this period the mortality was observed. Some of the results were as follows:

TABLE II

| Test Chemical | Concn., Percent Actual Chemical (wt./vol. liquid sprayed) | Percent Mortality |
|---|---|---|
| N-methoxy-N-methyl α-(O,O-dimethylphosphorodithioate)-β-ethoxycarbonylpropionamide | 0.35 | 100 |
| Do | 0.10 | 100 |
| Do | 0.05 | 100 |
| Do | 0.025 | 100 |
| Do | 0.01 | 100 |
| Do | 0.005 | 90 |
| N-methoxy-N-isopropyl α-(O,O-dimethylphosphorodithioate)-β-ethoxycarbonylpropionamide | 0.35 | 100 |
| Do | 0.10 | 100 |
| Do | 0.05 | 100 |
| Control | 0.0 | 0 |

In still another test, the utility of the compound of this invention as an insecticide was further illustrated by spraying adult pea aphids with the above formulation containing the indicated amount of test compound, transferring the aphids to pea plants also sprayed with the formulation, and observed the mortality after 48 hours. Some of the results were as follows:

TABLE III

| Test Chemical | Concn., Percent Actual Chemical (wt./vol. liquid sprayed) | Percent Mortality |
|---|---|---|
| N-methoxy-N-methyl α-(O,O-dimethylphosphorodithioate)-β-ethoxycarbonylpropionamide | 0.35 | 100 |
| Do | 0.05 | 100 |
| Do | 0.025 | 100 |
| Do | 0.01 | 100 |
| Do | 0.0075 | 90 |
| Do | 0.005 | 90 |
| N-methoxy-N-isopropyl α-(O,O-dimethylphosphorodithioate)-β-ethoxycarbonylpropionamide | 0.35 | 100 |
| Do | 0.05 | 100 |
| Do | 0.025 | 100 |
| Do | 0.01 | 100 |
| Do | 0.0075 | 100 |
| Do | 0.005 | 100 |
| Control | 0.0 | 0 |

The utility of the compounds of the present invention as miticides was illustrated in experiments for the control of strawberry spider mites (*Tetranychus atlanticus*). In these experiments, lima bean plants previously infested with from 50 to 100 adults of the mites were dipped into the formulations and held for five days. Thereafter adult mortality was observed. Some of the results were as follows:

TABLE IV

| Test Chemical | Concn., Percent Actual Chemical (wt./vol. liquid) | Percent Mortality |
|---|---|---|
| N-methoxy-N-methyl α-(O,O-dimethylphosphorodithioate)-β-ethoxycarbonylpropionamide | 0.35 | 100 |
| Do | 0.10 | 100 |
| Do | 0.05 | 93 |
| Do | 0.025 | 78 |
| N-methoxy-N-isopropyl α-(O,O-dimethylphosphorodithioate)-β-ethoxycarbonylpropionamide | 0.35 | 100 |
| Do | 0.10 | 100 |
| Do | 0.05 | 100 |
| Do | 0.025 | 100 |
| Do | 0.01 | 95 |
| Do | 0.0075 | 92 |
| Do | 0.005 | 79 |
| Control | 0.0 | 0 |

We claim:
1. A compound of the formula:

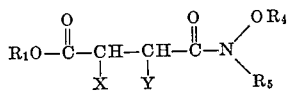

wherein X and Y are selected from the group consisting of hydrogen and

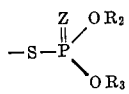

provided that one, and only one, of X and Y is hydrogen; $R_1$, $R_2$, and $R_3$ are alkyl; $R_4$ and $R_5$ are independently selected from the group consisting of hydrogen and alkyl; and Z is independently selected from the group consisting of sulfur and oxygen.

2. A compound of the formula:

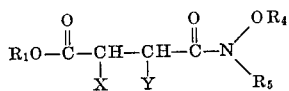

wherein X and Y are selected from the group consisting of hydrogen and

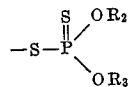

provided that one, and only one, of X and Y is hydrogen; $R_1$, $R_2$ and $R_3$ are alkyl containing one to ten carbon atoms; $R_4$ and $R_5$ are independently selected from the group consisting of hydrogen and alkyl containing one to ten carbon atoms.

3. N - methoxy - N - isopropyl α-(O,O-dimethylphosphorodithioate)-β-ethoxycarbonylpropionamide.
4. N - methoxy - N - methyl α-(O,O-dimethylphosphorodithioate)-β-ethoxycarbonylpropionamide.
5. N - methoxy - N - isopropyl α-(O,O,-dimethylphosphorodithioate)-β-methoxycarbonylpropionamide.
6. N - methoxy - N - isopropyl α-(O,O-diethylphosphorodithioate)-β-methoxycarbonylpropionamide.
7. N - methoxy - N - methyl α-(O,O-dimethylphosphorodithioate)-β-methoxycarbonylpropionamide.
8. N - ethoxy - N - ethyl α-(O,O-dimethylphosphorodithioate)-β-methoxycarbonylpropionamide.

References Cited
UNITED STATES PATENTS
2,630,451   3/1953   Fletcher et al. _____ 260—942

CHARLES B. PARKER, Primary Examiner.
A. H. SUTTO, Assistant Examiner.

UNITED STATES PATENT OFFICE
CERTIFICATE OF CORRECTION

Patent No. 3,342,904                      September 19, 1967

Eugene F. Barnas et al.

It is hereby certified that error appears in the above numbered patent requiring correction and that the said Letters Patent should read as corrected below.

Column 2, line 4, for "drovy" read -- droxy --; line 15, for "monoxy" read -- nonoxy --; same column 2, lines 21 to 24, the formula should appear as shown below instead of as in the patent:

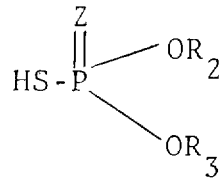

column 3, line 19, for "monethyl" read -- monoethyl --; column 9, line 11, for "phylloxers" read -- phylloxera --; column 10, line 27, for "observed" read -- observing --.

Signed and sealed this 1st day of October 1968.

(SEAL)
Attest:

EDWARD M. FLETCHER, JR.                  EDWARD J. BRENNER
Attesting Officer                         Commissioner of Patents